(12) United States Patent
Powell et al.

(10) Patent No.: US 7,798,406 B2
(45) Date of Patent: Sep. 21, 2010

(54) GRAPHICAL CODE READERS FOR BALANCING DECODE CAPABILITY AND SPEED

(75) Inventors: George Powell, Sandy, UT (US); Paul Hepworth, Riverton, UT (US)

(73) Assignee: The Code Corporation, Bluffdale, UT (US)

( * ) Notice: Subject to any disclaimer, the term of this patent is extended or adjusted under 35 U.S.C. 154(b) by 422 days.

(21) Appl. No.: 11/358,459

(22) Filed: Feb. 21, 2006

(65) Prior Publication Data

US 2007/0194118 A1 Aug. 23, 2007

(51) Int. Cl.
G06K 7/10 (2006.01)
G06K 7/14 (2006.01)
(52) U.S. Cl. ...................... 235/454; 235/494
(58) Field of Classification Search .......... 235/454, 235/494, 462.45, 462.2, 462.26, 462.32, 235/462.36, 462.3
See application file for complete search history.

(56) References Cited

U.S. PATENT DOCUMENTS

2004/0262393 A1* 12/2004 Hara et al. ............. 235/462.14
2005/0103865 A1* 5/2005 Zhu et al. .............. 235/462.45
2005/0276458 A1 12/2005 Jones et al.
2005/0278239 A1 12/2005 Jones et al.
2006/0010071 A1 1/2006 Jones et al.
2006/0027657 A1 2/2006 Ninnink et al.

OTHER PUBLICATIONS

U.S. Appl. No. 11/756,491, filed May 31, 2007, Paul Hepworth et al.

* cited by examiner

*Primary Examiner*—Edwyn Labaze
(74) *Attorney, Agent, or Firm*—Austin Rapp & Hardman (57) ABSTRACT

In an exemplary embodiment, a graphical code reader is disclosed that includes an image capture component that is configured to capture images at different resolutions. The graphical code reader also includes a processor, and memory in electronic communication with the processor. Instructions are stored in the memory. The instructions are executable to implement a method that involves providing a sequence that defines how resolutions of the captured images are varied. The method also involves capturing the images. The method also involves varying the resolutions of the captured images according to the sequence. The method also involves attempting to decode graphical codes within the captured images.

21 Claims, 11 Drawing Sheets

GRAPHICAL CODE READERS FOR BALANCING DECODE CAPABILITY AND SPEED

TECHNICAL FIELD

The present invention relates generally to graphical code readers. More specifically, the present invention relates to graphical code readers for balancing decode capability and speed.

BACKGROUND

A machine-readable graphical code ("graphical code") is a graphical representation of information that consists of multiple graphical code elements having different light reflective or light emissive properties. Examples of different types of graphical codes include bar codes, data matrix codes, Maxi-Codes, and so forth.

Devices for identifying or extracting information from graphical codes are generally referred to as graphical code readers. Image-based graphical code readers typically include one or more light sources for illuminating a graphical code. Light is reflected from the graphical code toward the graphical code reader. A lens within the graphical code reader focuses an image of the graphical code onto an image sensor. Pixels within the image sensor are read electronically to provide a two-dimensional array of image data corresponding to the graphical code. A decoder then processes the image data and extracts the information contained in the graphical code.

Different types of graphical codes include different types of graphical code elements. For example, bar codes include variable-width rectangular bars. Data matrix codes include square data modules. MaxiCodes include a central finder pattern and a grid of hexagons surrounding the central finder pattern.

Different types of graphical codes may vary in size. For example, bar codes are typically larger in size than data matrix codes. The graphical code elements within different types of graphical codes may also vary in size. For example, the variable-width rectangular bars in bar codes are typically larger than the square data modules in data matrix codes or the hexagons in MaxiCodes.

Graphical codes and graphical code readers have become widely used in many commercial environments, such as point-of-sale stations in retail stores and supermarkets, inventory and document tracking, and the like. Accordingly, there is a need for graphical code readers that have additional functionality related to reading and decoding graphical codes. Improved graphical code readers may enable users to read graphical codes more quickly and/or more accurately, thereby allowing users to work more efficiently and accomplish more in less time.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

In an exemplary embodiment, a graphical code reader that is configured to vary resolutions of captured images is disclosed. The graphical code reader includes an image capture component that is configured to capture images at different resolutions. The graphical code reader also includes a processor, and memory in electronic communication with the processor. Instructions are stored in the memory. The instructions are executable to implement a method for varying resolutions of captured images. In accordance with the method, a sequence is provided that defines how resolutions of the captured images are varied. The graphical code reader varies the resolutions of captured images according to the sequence. The captured images have substantially the same field of view. A decoder within the graphical code reader attempts to decode graphical codes within the captured images.

In another embodiment, a graphical code reader that is configured to adaptively vary resolutions of captured images based on information about a user's decoding environment is disclosed. The graphical code reader includes an image capture component that is configured to capture images at different resolutions. The graphical code reader also includes a processor, and memory in electronic communication with the processor. Instructions are stored in the memory. The instructions are executable to implement a method for adaptively varying resolutions of captured images based on information about a user's decoding environment. In accordance with the method, a sequence is provided that defines how resolutions of the captured images are varied. The graphical code reader captures an image at low resolution whenever a preceding low-resolution image is successfully decoded. Otherwise, the graphical code reader varies the resolutions at which the images are captured according to the sequence. The captured images have substantially the same field of view. A decoder within the graphical code reader attempts to decode graphical codes within the captured images.

The sequence that defines how resolutions of the captured images are varied may be modified based on the decoding history. Modifying the sequence based on the decoding history may involve modifying a frequency of a particular resolution in the sequence in proportion to success that has been achieved at that resolution. Alternatively, or in addition, modifying the sequence based on the decoding history may involve predicting low-resolution decoding success for higher resolution images that are successfully decoded. Minimum frequencies may be provided for the resolutions in the sequence. Where this occurs, the graphical code reader may ensure that any modifications to the defined sequence comply with the specified minimum frequencies.

In another embodiment, a graphical code reader that is configured to adaptively change one or more characteristics of captured images in order to balance decode capability and speed is disclosed. The graphical code reader includes an image capture component that is configured to capture images at different resolutions. The graphical code reader also includes a processor, and memory in electronic communication with the processor. Instructions are stored in the memory. The instructions are executable to implement a method for adaptively changing one or more characteristics of captured images in order to balance decode capability and speed. In accordance with the method, user input is received, and the graphical code reader captures images in response to the user input. The graphical code reader varies the resolutions and the fields of view of the captured images based on a sequence and/or decoding history. A decoder within the graphical code reader attempts to decode graphical codes within the captured images.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the term "multi-resolution" graphical code reader refers to a graphical code reader that is capable of capturing images at more than one resolution. The term "low resolution" refers to the lowest possible resolution at which a multi-resolution reader may capture an image. The term "high resolution" refers to the highest possible resolution at which a multi-resolution reader may capture an image. A multi-resolution reader may also be capable of capturing one or more intermediate resolution images, i.e., images whose resolution is somewhere between that of a low-resolution image and a high-resolution image. The term "higher resolution" image refers to any image that is captured at a resolution other than low-resolution. Similarly, the term "lower resolution" image refers to any image that is captured at a resolution other than high resolution.

It generally requires less time to capture and decode low-resolution images than it requires to capture and decode high-resolution images of the same area (field of view). For example, decoding time is roughly proportional to the number of pixels that are being processed. Therefore, if a low-resolution image contains ¼ as many pixels as a high-resolution image, then a low-resolution image may be decoded in about ¼ the time as a high-resolution image. Accordingly, to achieve faster image transfer and processing, it is preferable for a multi-resolution reader to capture low-resolution images whenever they may be used to decode the kinds of graphical codes that are being read. However, low-resolution images may not include sufficient detail to enable successful decoding of high-density codes (i.e., codes with very small features). For example, in a low-resolution image, the elements of a high-density code may blur together. Accordingly, higher resolution images may sometimes be needed in order to successfully decode high-density codes.

Embodiments disclosed herein relate generally to ways that a multi-resolution graphical code reader may be configured in order to balance the increased decode capability that is provided by capturing and processing high-resolution images and the increased speed that is achieved by capturing and processing low-resolution images. More specifically, embodiments disclosed herein relate to ways that the resolutions (and possibly other characteristics, such as field of view) of captured images may be adaptively changed based on the environment in which the graphical code reader is being used.

Figure 1:
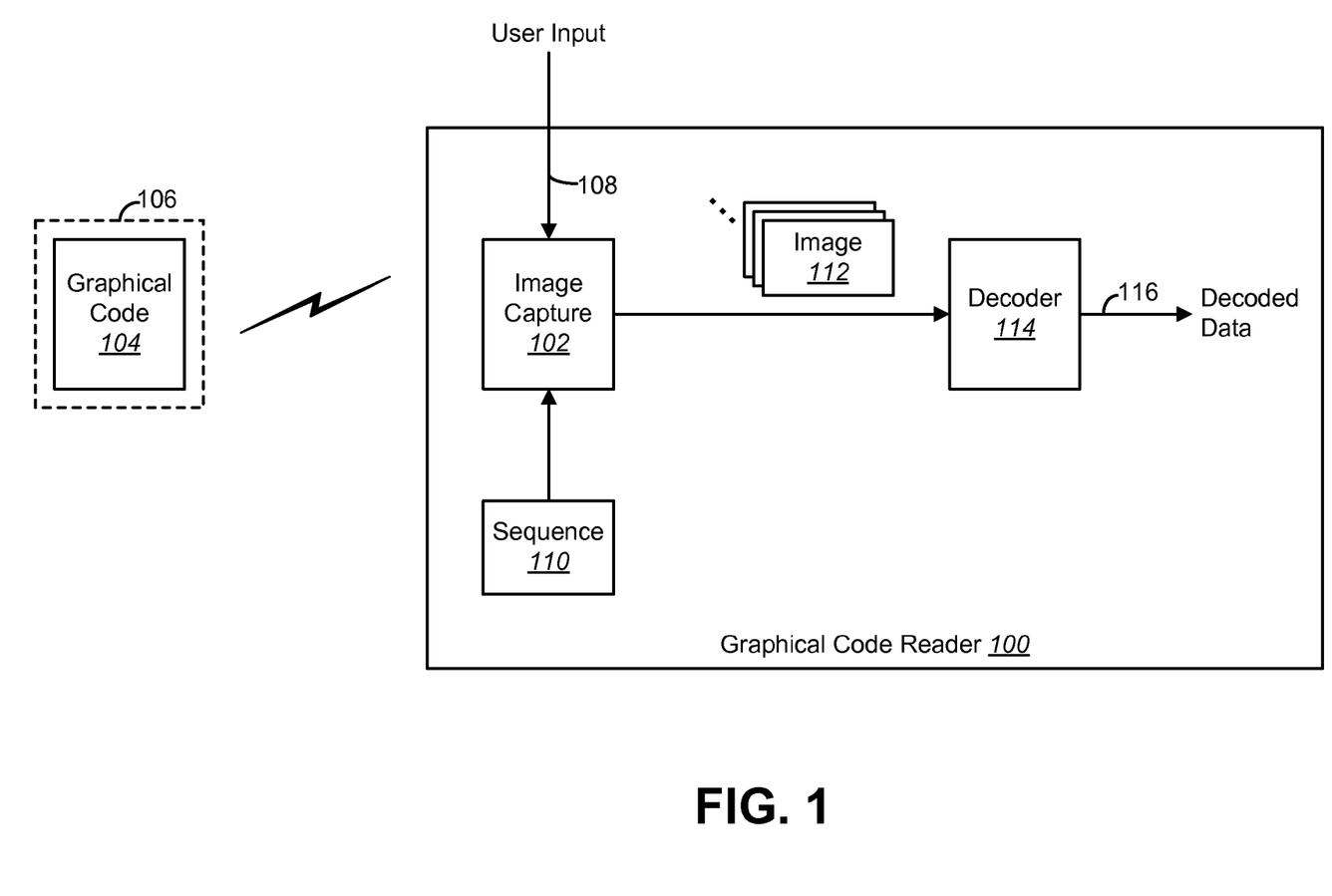
FIG. 1 illustrates an embodiment of a multi-resolution graphical code reader that is configured to vary resolutions of captured images.

FIG. 1 illustrates an embodiment of a multi-resolution graphical code reader 100 that is configured to vary resolutions of captured images. The graphical code reader 100 includes an image capture component 102. The image capture component 102 is configured to capture images 112 of objects, such as graphical codes 104, that are positioned within a target area 106. The image capture component 102 is capable of capturing the images 112 at multiple resolutions.

The image capture component 102 typically captures images 112 in response to user input 108. The user input 108 may take a variety of forms. For example, the user may initiate image capture by activating an input button (not shown) on the graphical code reader 100.

In the illustrated embodiment, the images 112 that are captured all have the same field of view. However, the image capture component 102 varies the resolutions of the captured images according to a predefined sequence 110. Therefore, the image capture component 102 captures some images 112 at high resolution and some images 112 at low resolution. The image capture component 102 may also capture some images 112 at one or more intermediate resolutions.

For example, suppose that the following sequence 110 is used:

LOW LOW HIGH LOW LOW HIGH . . . .

In this example, the first two images 112 are captured at low resolution, the third image 112 is captured at high resolution, the fourth and fifth images 112 are captured at low resolution, the sixth image 112 is captured at high resolution, and so on.

The sequence 110 may be defined so as to take into account characteristics of the user's environment. For example, if the reader 100 is going to be used to read high-density graphical codes 104, then the sequence 110 may be defined so that more high-resolution images 112 are captured than low-resolution images 112. Conversely, if the reader 100 is going to be used to read large, low-density graphical codes 104, then the sequence 110 may be defined so that more low-resolution images 112 are captured than high-resolution images 112.

In some embodiments, the resolutions of the captured images 112 are varied automatically. In this context, the term "automatically" means that the user is not required to initiate the varying of the resolutions as a separate step. Rather, the image capture component 102 varies the resolutions of the captured images 112 as part of image capture.

The captured images 112 are provided to a decoder 114 for processing. The decoder 114 attempts to identify and decode a graphical code 104 in each captured image 112. If the decoder 114 is able to identify and successfully decode a graphical code 104 in a captured image 112, then the decoder 114 outputs decoded data 116. The decoded data 116 may be used by other components in the graphical code reader 100 and/or transmitted to another computing device.

Figure 2:
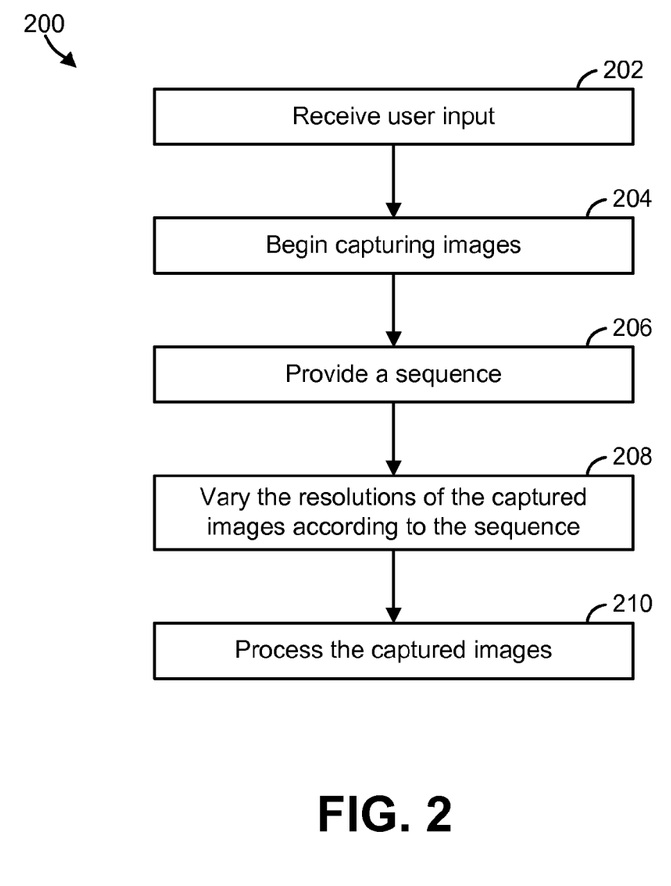
FIG. 2 illustrates an exemplary method that may be performed by the graphical code reader of FIG. 1.

FIG. 2 illustrates an exemplary method 200 that may be performed by the graphical code reader 100 of FIG. 1. In response to receiving 202 user input 108, the image capture component 102 begins capturing 204 images 112.

A sequence 110 is provided 206. The sequence 110 may be defined so as to take into account characteristics of the user's environment, such as the types of graphical codes 104 that are going to be read. The resolutions of the captured images 112 are automatically varied 208 according to the sequence 110.

The captured images 112 are provided to a decoder 114 for processing 210. The decoder 114 attempts to identify and decode a graphical code 104 in each captured image 112.

Figure 3:
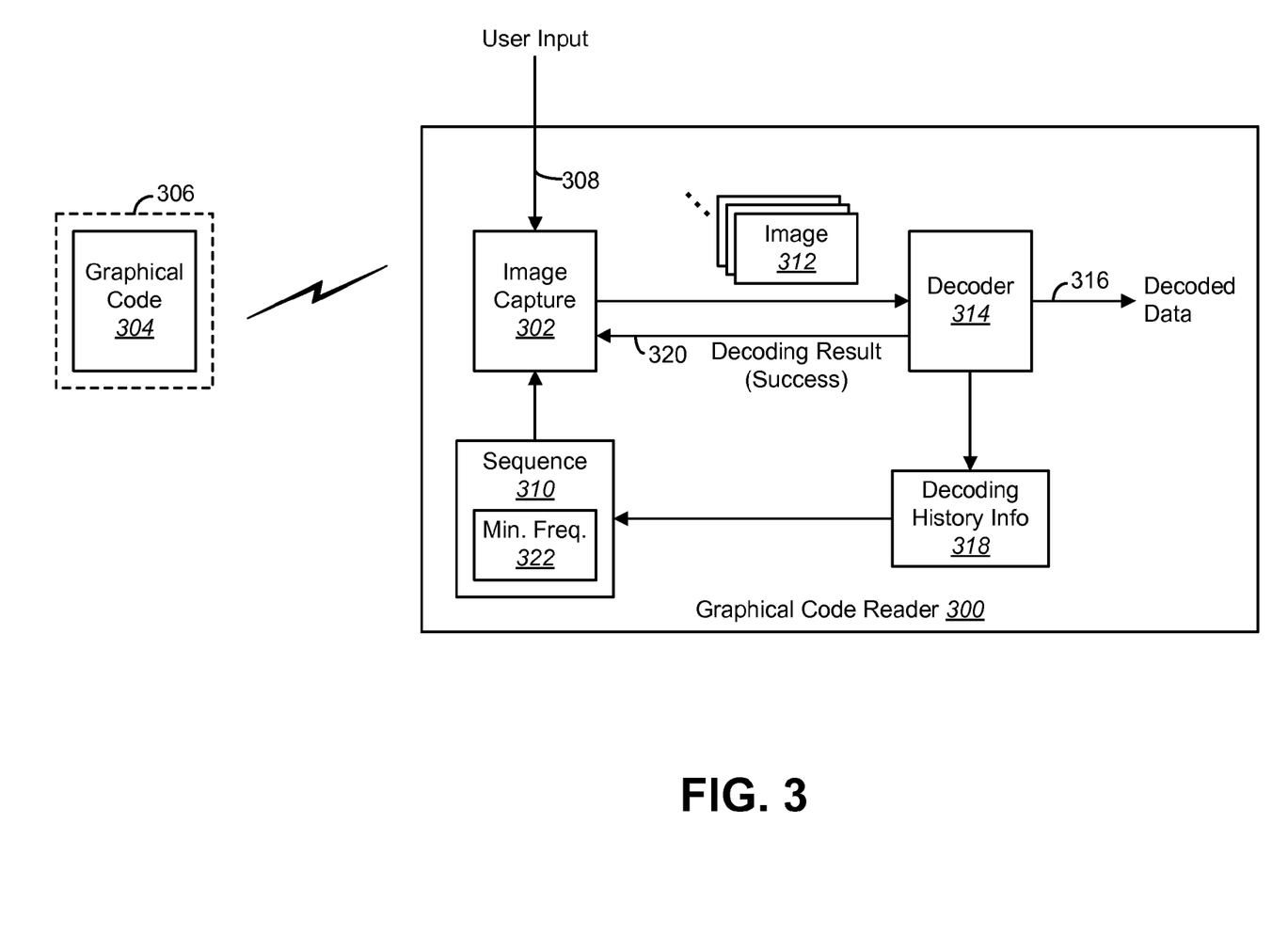
FIG. 3 illustrates an embodiment of a multi-resolution graphical code reader that is configured to adaptively vary resolutions of captured images based on information about a user's decoding environment.

FIG. 3 illustrates an embodiment of a multi-resolution graphical code reader 300 that is configured to adaptively vary resolutions of captured images based on information about a user's decoding environment. Like the embodiment described previously, the graphical code reader 300 includes an image capture component 302 that is configured to capture images 312 at multiple resolutions. The images 312 that are captured all have the same field of view, and the image capture component 302 varies the resolutions of the captured images 312 according to a predefined sequence 310.

However, there are two differences between the embodiment described previously and the embodiment shown in FIG. 3. First, in the embodiment shown in FIG. 3, the image capture component 302 may (at least temporarily) stop following the sequence 310 based on decoding results 320. More specifically, when a low-resolution image 312 is successfully decoded, the image capture component 302 continues to capture subsequent images 312 at low resolution, regardless of what is specified in the sequence 310. The image capture component 302 continues to capture images 312 at low resolution until the decoder 314 is unable to successfully decode one of the low-resolution images 312. When this occurs, the image capture component 302 starts following the sequence once again.

For example, suppose that the following sequence 310 is used:

HIGH LOW HIGH . . . .

In this example, the first image 312 is captured at high resolution, and the second image 312 is captured at low resolution. If a graphical code 304 is identified in the second, low-resolution image 312 and successfully decoded, then the image capture component 302 stops following the sequence 310 and captures the next image 312 at low resolution. Therefore, the third image 312 is captured at low resolution, even though the sequence 310 specifies that the third image 312 should be captured at high resolution. The image capture component 302 continues to capture low-resolution images 312 until the decoder 314 is unable to successfully decode one of the low-resolution images 312.

When the reader 300 begins following the sequence 310 again, the reader 300 may begin at the point in the sequence 310 where it previously left off. Thus, in the above example, when the decoder 314 is unable to successfully decode one of the low-resolution images 312, the image capture component 302 may capture the next image 312 at high resolution, because that is the point in the sequence 310 where it previously left off.

Another difference between the embodiment shown in FIG. 3 and the embodiment described previously is that in the embodiment shown in FIG. 3, the sequence 310 is modified based on decoding history so as to better reflect characteristics of the user's environment. The frequency at which images 312 of a particular resolution are captured may be modified in proportion to the amount of success that has been achieved at that resolution. For example, if low-resolution images 312 are generally successfully decoded, then the sequence 310 may be modified to increase the frequency of low-resolution images 312 and decrease the frequency of high-resolution images 312.

In some embodiments the sequence 310 may be automatically modified based on decoding history. In this context, the term "automatically" means that the user is not required to initiate modifications being made to the sequence as a separate step. Rather, the sequence is modified based on decoding history as part of image capture. As indicated previously, the user may initiate image capture by, e.g., activating an input button.

To facilitate decoding history-based modification of the sequence 310, decoding history information 318 is maintained. The decoding history information 318 includes data about the amount of decoding success that has been achieved at different resolutions. The decoding history information 318 may be updated periodically. For example, the decoding history information 318 may be updated each time that an image 312 is processed by the decoder 314.

As shown, the sequence 310 may specify minimum frequencies 322 for the resolutions in the sequence 310. For example, the sequence 310 may specify that out of every ten images, at least one is a high-resolution image and at least three are low-resolution images. When the sequence 310 is updated based on the decoding history information 318, the reader 300 may ensure that the minimum frequencies 322 are satisfied, i.e., that any modifications to the sequence 310 comply with the minimum frequencies 322 that are specified.

Figure 4:
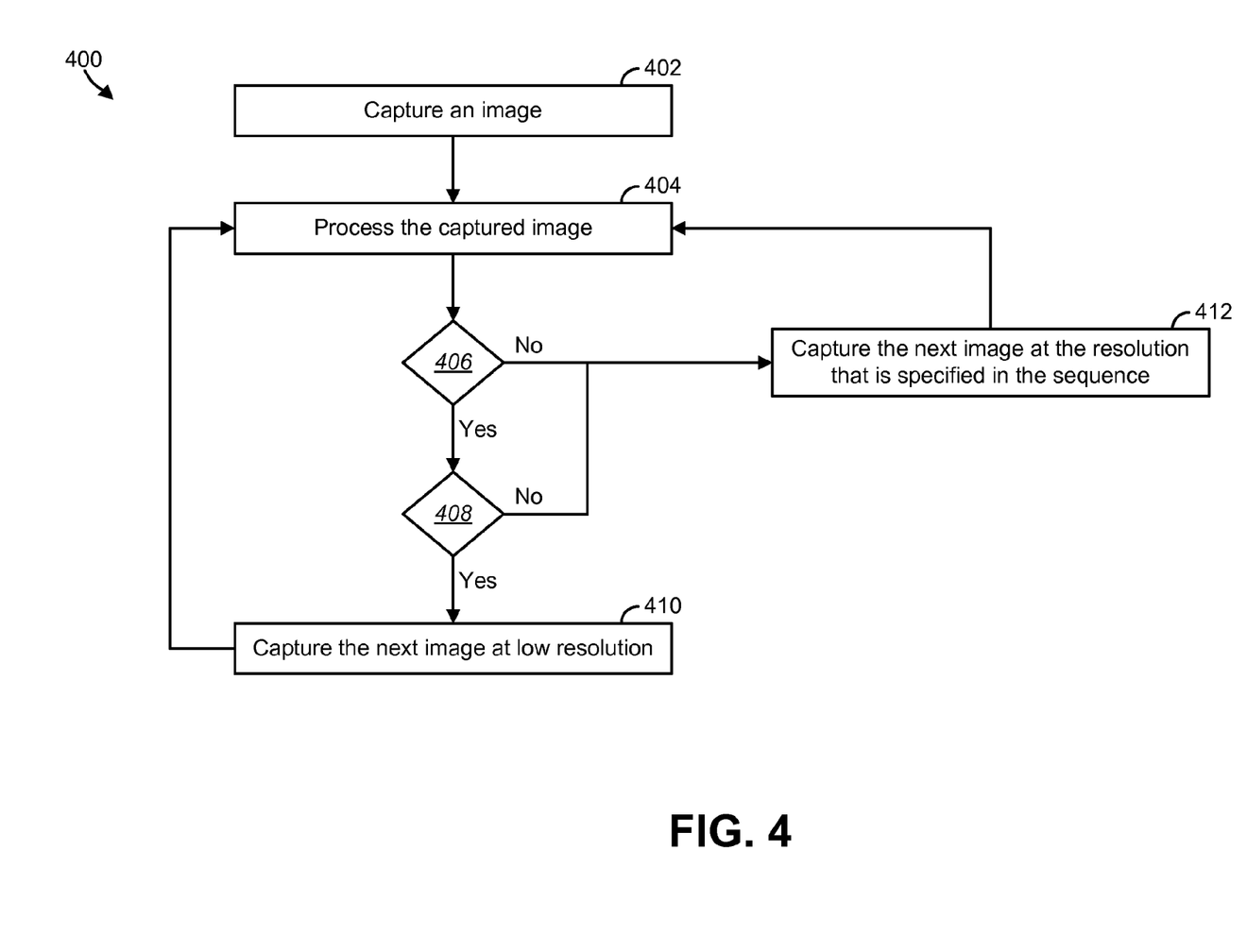
FIG. 4 illustrates an exemplary method that may be performed by the graphical code reader of FIG. 3.

FIG. 4 illustrates an exemplary method 400 that may be performed by the graphical code reader of FIG. 3. An image 312 is captured 402 and processed 404. It is determined 406 whether the image 312 was successfully decoded. If the image 312 was successfully decoded, then it is determined 408 whether the image 312 is a low-resolution image. If the image 312 is a low-resolution image, then the next image 312 is captured 410 at low resolution. However, if it is determined 406 that the image 312 is not successfully decoded, or if it is determined 408 that the image 312 is not a low-resolution image, then the next image 312 is captured 412 at the resolution that is specified in the sequence. In either case, the method then returns to step 404 and proceeds as described above.

Figure 5:
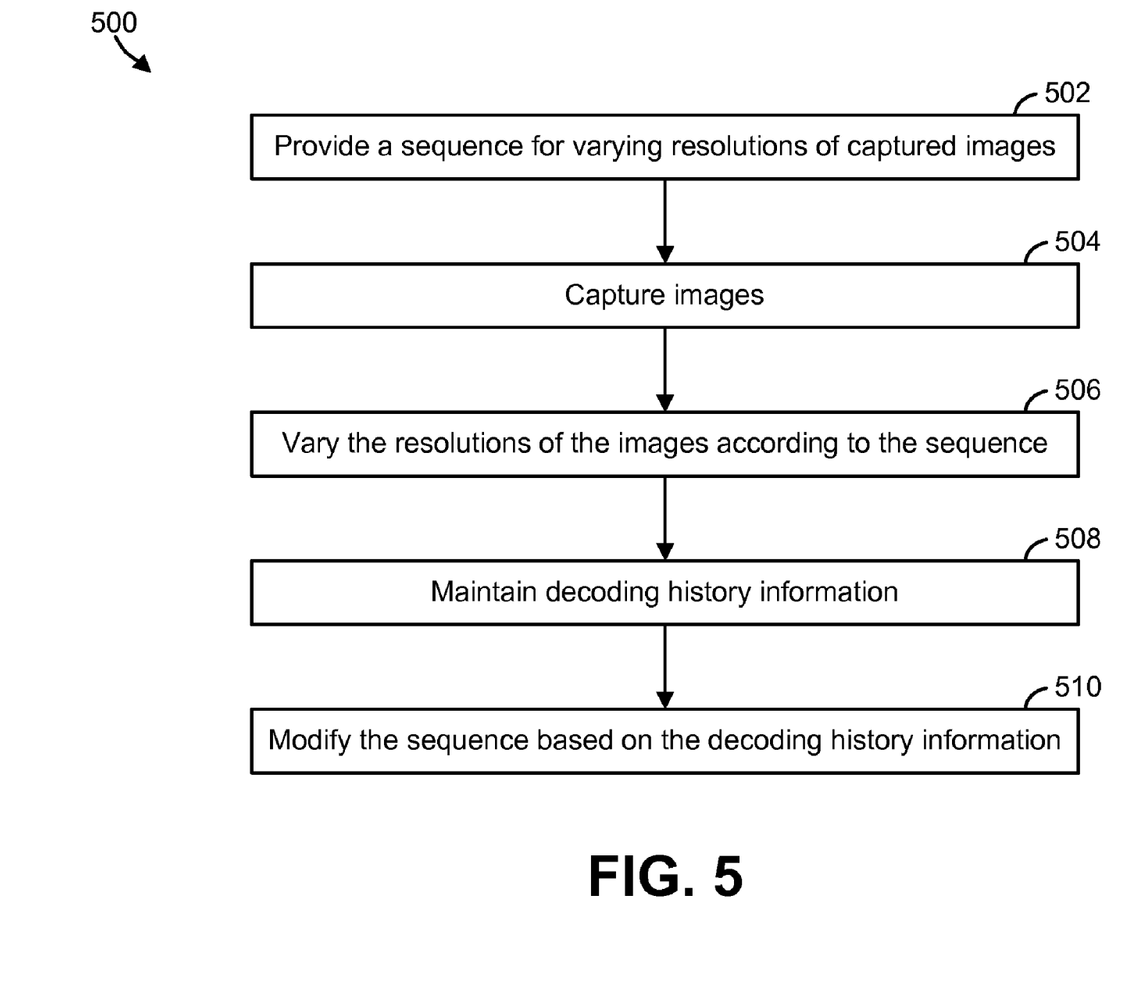
FIG. 5 illustrates another exemplary method that may be performed by the graphical code reader of FIG. 3.

FIG. 5 illustrates another exemplary method 500 that may be performed by the graphical code reader 300 of FIG. 3. The method 500 involves providing 502 a sequence for varying the resolutions of images 312 that are captured by the image capture component 302. In response to receiving user input 308, the image capture component 302 begins capturing 504 images 312. The resolutions of the captured images 312 are automatically varied 506 according to the sequence 310 (except when low-resolution images 312 are successfully decoded, as described above).

The illustrated method 500 also involves maintaining 508 decoding history information 318. The decoding history information 318 includes data about the amount of decoding success that has been achieved at different resolutions. The decoding history information 318 may be updated periodically. For example, the decoding history information 318 may be updated each time that an image 312 is processed by the decoder 314.

From time to time, the sequence 310 is modified 510 based on the decoding history information 318. For example, the frequency at which images 312 of a particular resolution are captured in the sequence 310 may be modified in proportion to the amount of success that has been achieved at that resolution.

Figure 6A:
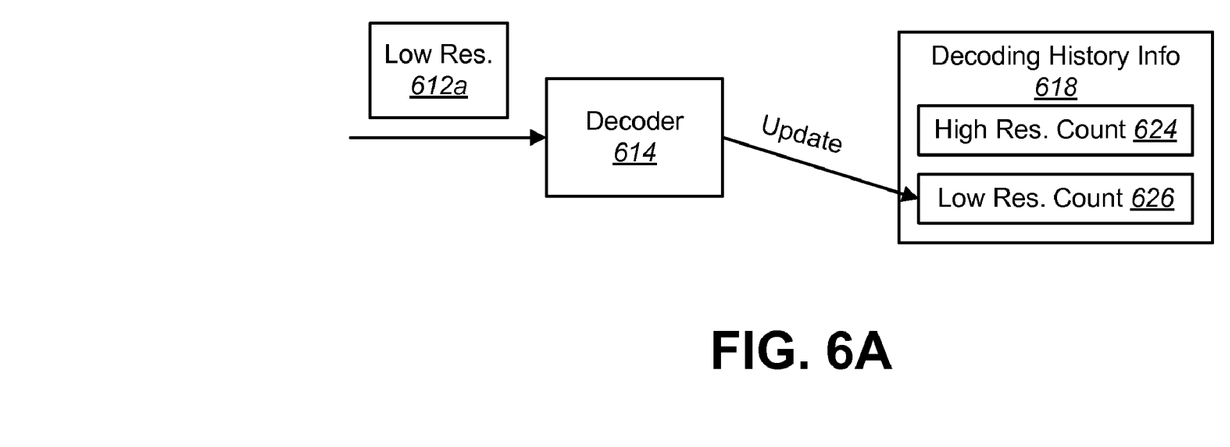
FIGS. 6A and 6B illustrate an exemplary way that decoding history information may be updated when an image is processed.
Figure 6B:
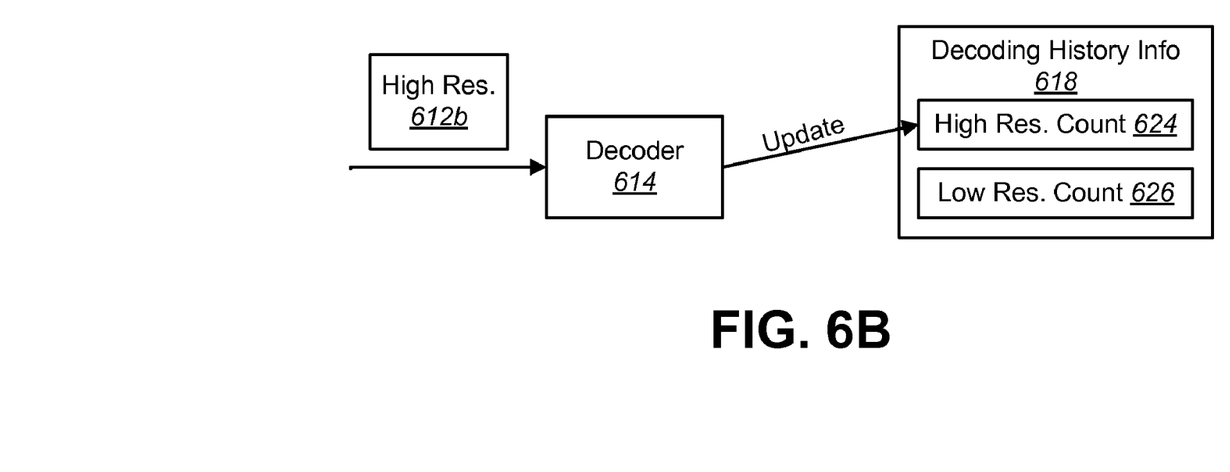

FIGS. 6A and 6B illustrate an exemplary way that decoding history information 618 may be updated when an image 612 is processed. As shown, the decoding history information 618 may include decode counts for each resolution at which the graphical code reader 300 is capable of capturing images 612. In the illustrated embodiment, the decoding history information 618 includes a high-resolution decode count 624 and a low-resolution decode count 626.

When a low-resolution image 612a is processed by the decoder 614, the low-resolution decode count 626 is updated. This is shown in FIG. 6A. If the low-resolution image 612a is successfully decoded, the low-resolution decode count 626 is increased. If the low-resolution image 612a is not successfully decoded, the low-resolution decode count 626 is decreased. Similarly, when a high-resolution image 612b is processed by the decoder 614, the high-resolution decode count 624 is updated. This is shown in FIG. 6B. If the high-resolution image 612b is successfully decoded, the high-resolution decode count 624 is increased. If the high-resolution image 612b is not successfully decoded, the high-resolution decode count 624 is decreased.

Figure 7:
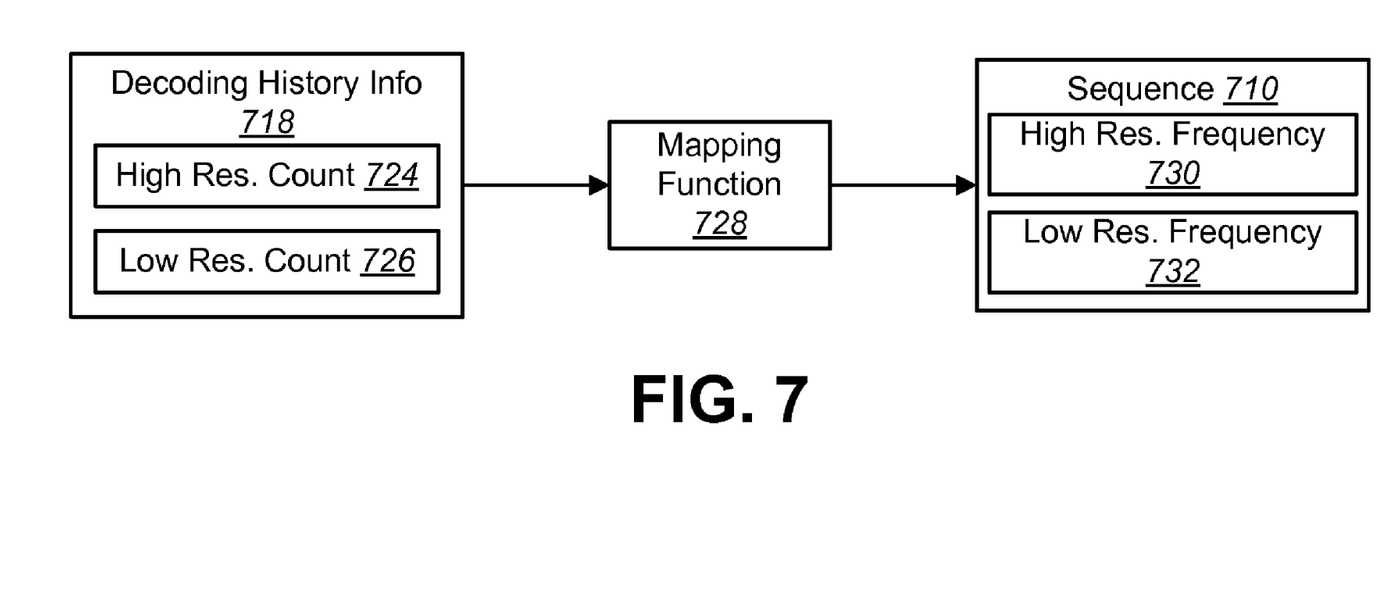
FIG. 7 illustrates a mapping function being applied to decode counts in the decoding history information in order to update the sequence.

As shown in FIG. 7, a mapping function 728 may be applied to the decode counts 724, 726 in the decoding history information 718 in order to update the sequence 710. In the illustrated embodiment, the frequency 730 of high-resolution images in the sequence 710 is determined by applying a mapping function 728 to the high-resolution decode count 724. Similarly, the frequency 732 of low-resolution images in the sequence 710 is determined by applying a mapping function 728 to the low-resolution decode count 726.

Figure 8A:
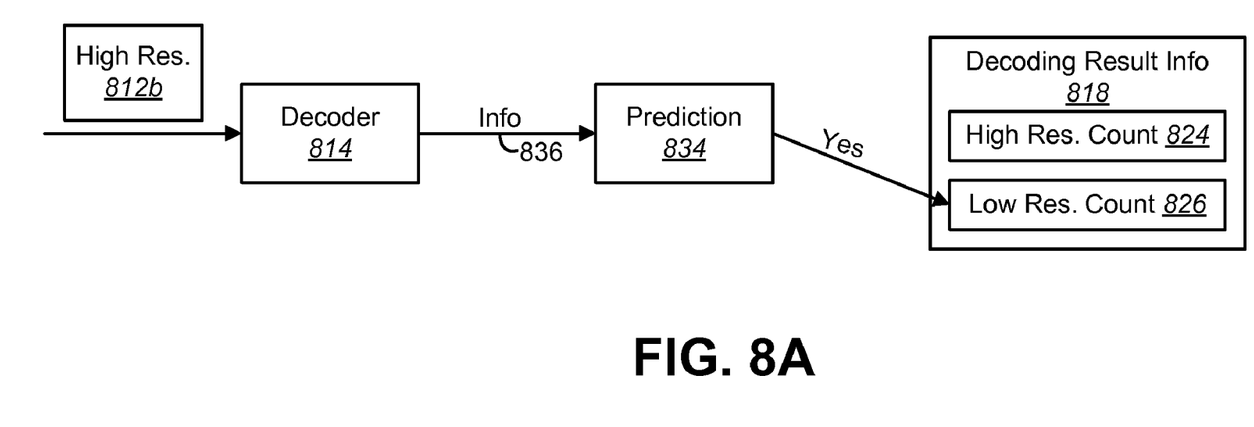
FIGS. 8A and 8B illustrate another exemplary way that the decoding history information may be updated.
Figure 8B:
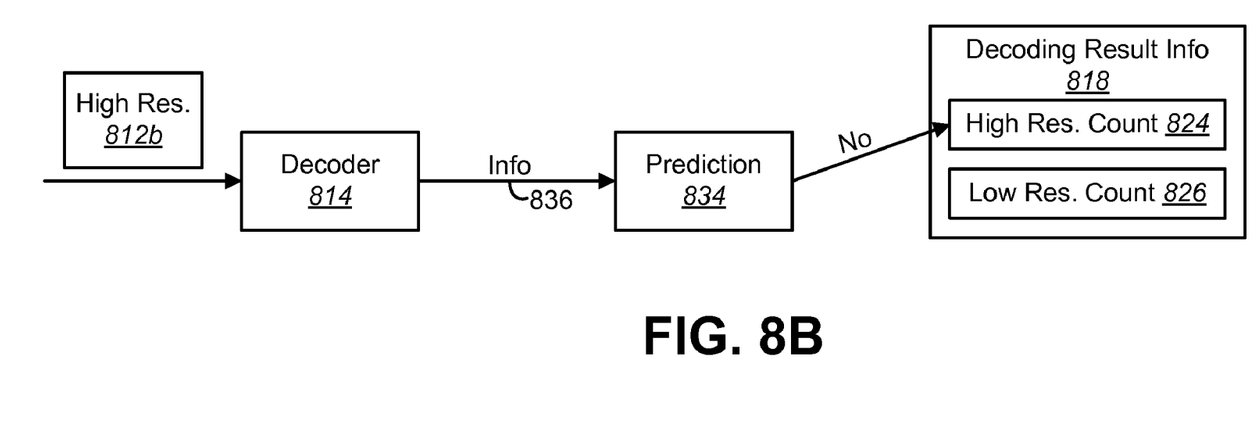

FIGS. 8A and 8B illustrate another exemplary way that the decoding history information 818 may be updated. In the illustrated embodiment, whenever a high-resolution image 812b is success fully decoded, a prediction is made about whether the high-resolution image 812b could have been decoded if it had been captured at low resolution. If it is predicted that the image 812b could have been decoded at low resolution, then the decoding history is updated to reflect that fact (i.e., the decoding history will be updated as though a low-resolution image was successfully decoded).

Information 836 about the decoded graphical code is provided to a prediction component 834. The information 836 may include, for example, the number of pixels that are present in the smallest feature of the decoded graphical code. Based on this information 836, the prediction component 834 predicts whether the high-resolution image 812b could have been decoded if it had been captured at low resolution. For example, the number of pixels that are present in the smallest feature of the graphical code may be compared with a threshold value for that type of graphical code. If a threshold value is exceeded, then it may be predicted that the image 812b could have been decoded at low resolution.

If it is predicted that the high-resolution image 812b could have been decoded at low resolution, then the low-resolution decode count 826 is increased. This is shown in FIG. 8A. However, if it is predicted that the high-resolution image 812b could not have been decoded at low resolution, then the high-resolution decode count 824 is increased. This is shown in FIG. 8B.

Figure 9:
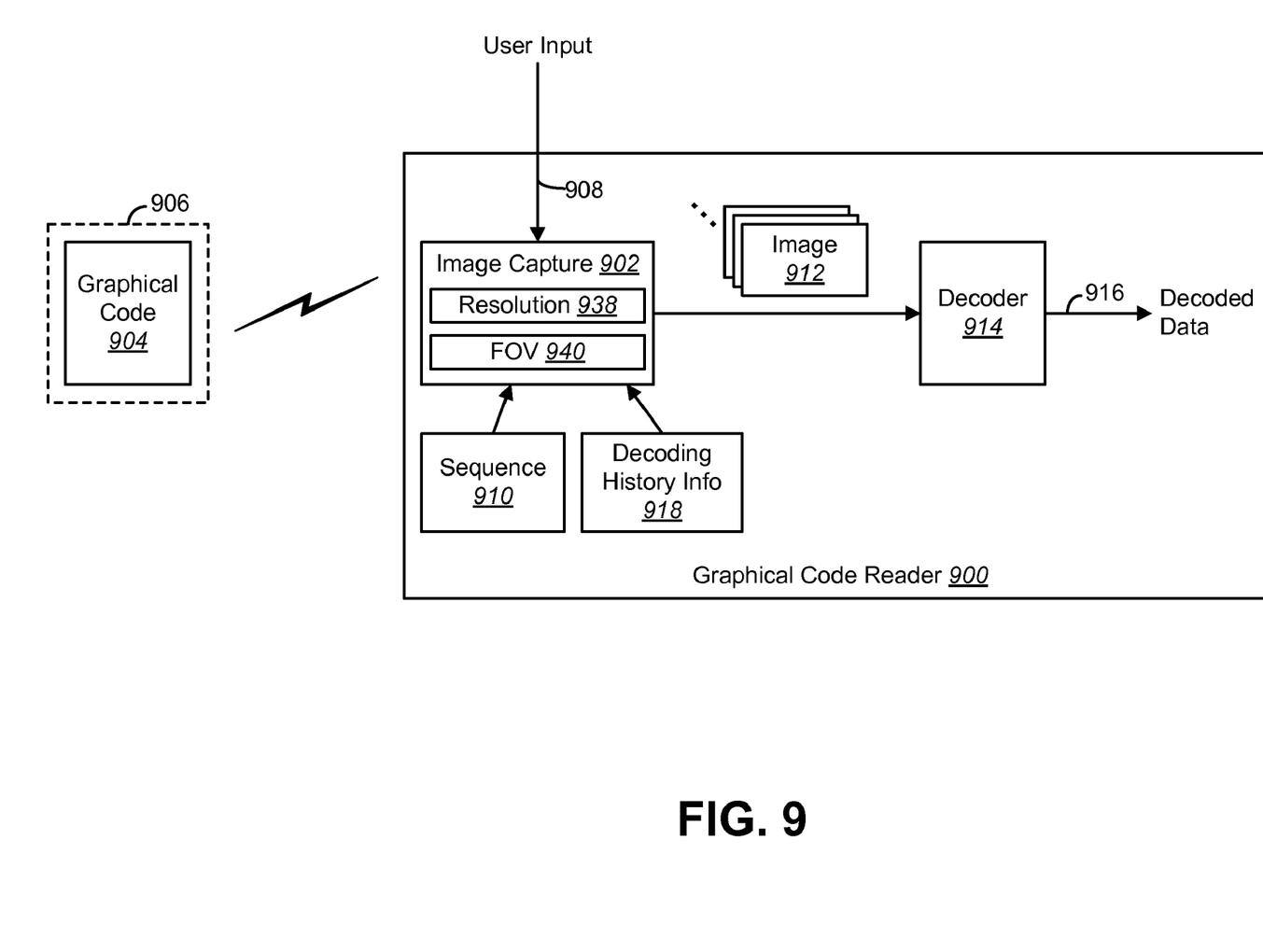
FIG. 9 illustrates an embodiment of a graphical code reader that is configured to adaptively change one or more characteristics of captured images in order to balance decode capability and speed.

FIG. 9 illustrates an embodiment of a graphical code reader 900 that is configured to adaptively change one or more characteristics of captured images in order to balance decode capability and speed. Like the embodiments described previously, the graphical code reader 900 includes an image capture component 902 that is configured to capture images 912 at multiple resolutions. The graphical code reader 900 also includes a decoder 914 that processes the captured images 912. When an image 912 is successfully decoded, the decoder 914 outputs decoded data 916.

In the embodiments described previously, all of the captured images have had the same field of view. In contrast, in the embodiment shown in FIG. 9 both the resolutions and the fields of view of the captured images 912 may be varied in order to adapt to the user's decoding environment. Accordingly, in FIG. 9 the image capture component 902 is shown as including both a resolution variation component 938 and a field of view variation component 940. The resolutions and the fields of view of the captured images 912 may be varied based on a sequence 910, on decoding history 918, etc.

Figure 10:
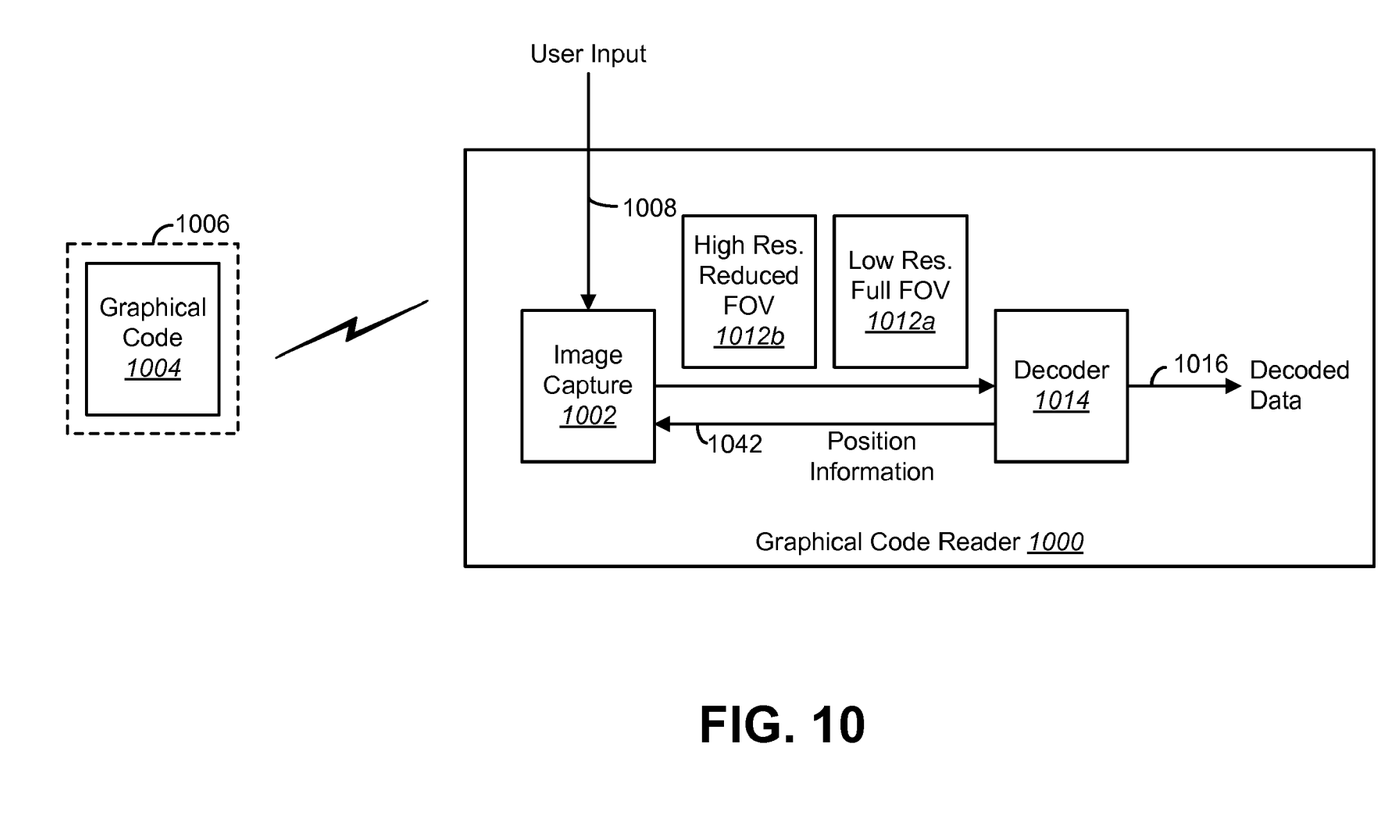
FIG. 10 illustrates another embodiment of a graphical code reader that is configured to adaptively change one or more characteristics of captured images in order to balance decode capability and speed.

FIG. 10 illustrates another embodiment of a graphical code reader 1000 that is configured to adaptively change one or more characteristics of captured images in order to balance decode capability and speed. The graphical code reader 1000 shown in FIG. 10 illustrates one way that both the resolution and the field of view of captured images may be varied in order to adapt to the user's decoding environment, as was described in general terms above in connection with FIG. 9.

In the illustrated embodiment, the image capture component 1002 may, under some circumstances, capture two images 1012 in an effort to read a single graphical code 1004. The first image 1012a will be referred to in the discussion that follows as the "preliminary" image. The second image 1012b will be referred to as the "follow-up" image.

The preliminary image 1012a may have full field of view, i.e., the field of view of the preliminary image 1012a may be the highest possible field of view provided by the image capture component 1002. In addition, the preliminary image 1012a is captured at low resolution. The decoder 1014 processes the preliminary image 1012a. The decoder 1014 may be able to successfully identify and decode a graphical code 1004 in the preliminary image 1012a (if the graphical code 1004 has sufficiently large features, for example). If the decoder 1014 is able to identify and successfully decode a graphical code 1004 in the preliminary image 1012a, then the decoder 1014 outputs decoded data 1016, and no follow-up image 1012b is taken.

If the decoder 1014 is not able to identify and successfully decode a graphical code 1004 in the preliminary image 1012a, then the decoder 1014 attempts to identify the position of the graphical code 1004 within the preliminary image 1012a. Information 1042 about the position of the graphical code 1004 within the preliminary image 1012a may then be used to determine the field of view of the follow-up image 1012b. The field of view of the follow-up image 1012b may be smaller than the field of view of the preliminary image 1012a. The smaller field of view substantially matches the position of the graphical code 1004 in the preliminary image 1012a. Ideally, the field of view of the follow-up image 1012b includes the graphical code 1004 but little, if anything else. In addition, the follow-up image 1012b has a higher resolution than the preliminary image 1012a. Therefore, from a conceptual standpoint it may be said that the image capture component 1002 has "zoomed in" on the graphical code 1004 within the preliminary image 1012a in order to capture the follow-up image 1012b.

If the image capture component 1002 is only capable of capturing images 1012 at a high resolution and a low resolution, then the follow-up image 1012b may be captured at high resolution. If the image capture component 1002 is capable of capturing images 1012 at one or more intermediate levels of resolution, then the follow-up image 1012b may be captured at one of the intermediate levels of resolution.

The decoder 1014 processes the follow-up image 1012b. If the decoder 1014 is able to identify and successfully decode a graphical code 1004 in the follow-up image 1012b, then the decoder 1014 outputs decoded data 1016.

In an alternative embodiment, the decoder 1014 attempts to identify the position of the graphical code 1004 within the preliminary image 1012a without attempting to decode the preliminary image 1012a. Information 1042 about the position of the graphical code 1004 within the preliminary image 1012a may then be used to determine the field of view of the follow-up image 1012b, as discussed above.

Figure 11:
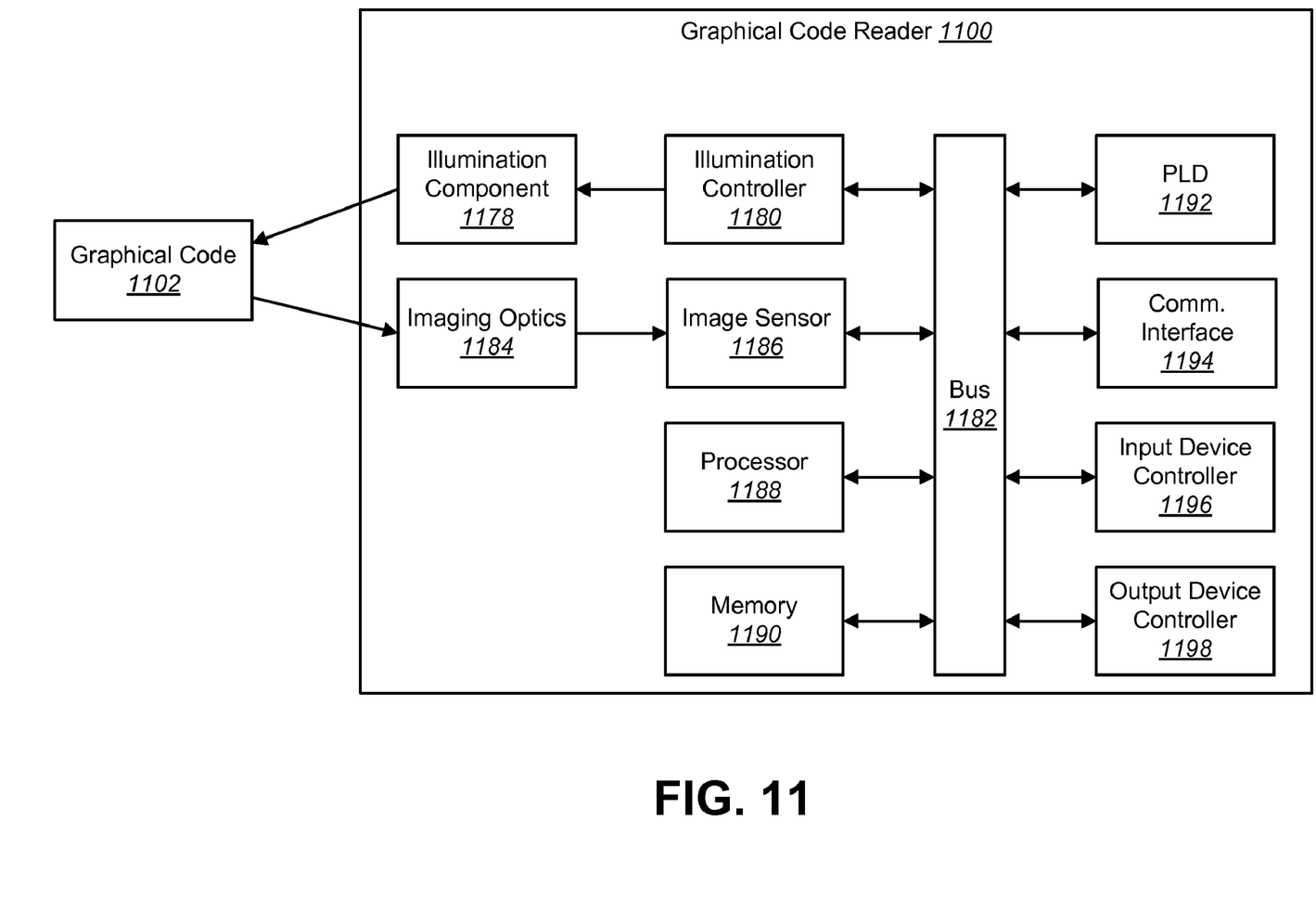
FIG. 11 is a block diagram illustrating the major hardware components typically utilized in a graphical code reader.

FIG. 11 is a block diagram illustrating the major hardware components typically utilized in a graphical code reader 1100. The different components may be located within the same physical structure or in separate physical structures.

The graphical code reader 1100 includes an illumination component 1178. The illumination component 1178 typically includes a plurality of illumination elements that may be activated to illuminate a graphical code 1102. The illumination component 1178 is controlled by an illumination controller 1180, which is in electronic communication with other components in the graphical code reader 1100 via a system bus 1182.

The graphical code reader 1100 also includes imaging optics 1184 and an image sensor 1186. The image sensor 1186 includes a plurality of light-sensitive elements. The imaging optics 1184 focus light reflected from the area illuminated by the illumination component 1178 onto the image sensor 1186. Examples of image sensors 1186 include charge coupled devices (CCDS) and complementary metal-oxide semiconductor (CMOS) sensors. A housing (not shown) is typically also provided for shielding the light-sensitive elements in the image sensor 1186 from ambient light. The image sensor 1186 is in electronic communication with other components in the graphical code reader 1100 via the system bus 1182.

The graphical code reader 1100 also includes a processor 1188 and memory 1190. The processor 1188 controls the operation of the graphical code reader 1100 and may be embodied as a microprocessor, a microcontroller, a digital signal processor (DSP) or other device known in the art. The processor 1188 typically performs logical and arithmetic operations based on program instructions stored within the memory 1190.

As used herein, the term "memory" 1190 is broadly defined as any electronic component capable of storing electronic information, and may be embodied as read only memory (ROM), random access memory (RAM), magnetic disk storage media, optical storage media, flash memory devices in RAM, on-board memory included with the processor 1188, EPROM memory, EEPROM memory, registers, etc. The memory 1190 typically stores program instructions and other types of data. The program instructions may be executed by the processor 1188 to implement some or all of the methods disclosed herein. The processor 1188 and memory 1190 are in electronic communication with other components in the graphical code reader 1100 via the system bus 1182.

The graphical code reader 1100 typically also includes one or more programmable logic devices (PLDs) 1192. The PLDs 1192 may be programmed to carry out logic functions that implement, either partially or completely, some or all of the methods disclosed herein. Examples of different types of PLDs 1192 that may be used include field-programmable gate arrays (FPGAs), logic-cell arrays (LCAs), programmed arrays of logic (PALs), complex programmable-logic devices (CPLDs), and so forth. The PLDs 1192 are in electronic communication with other components in the graphical code reader 1100 via the system bus 1182. One or more application-specific integrated circuits (ASICs) may be used in place of or in addition to the PLDs 1192.

The graphical code reader 1100 typically also includes one or more communication interfaces 1194 for communicating with other electronic devices. The communication interfaces 1194 may be based on wired communication technology, wireless communication technology, or both. Examples of different types of communication interfaces 1194 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth. The communication interfaces 1194 are in electronic communication with other components in the graphical code reader 1100 via the system bus 1182.

The graphical code reader 1100 typically also includes one or more input device controllers 1196 for controlling input devices, such as keys, buttons, etc. The graphical code reader 1100 typically also includes one or more output device controllers 1198 for controlling output devices, such as a display screen. The input device controllers 1196 and output device controllers 1198 are in electronic communication with other components in the graphical code reader 1100 via the system bus 1182.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations may be made in the arrangement, operation, and details of the methods and systems of the present invention disclosed herein without departing from the spirit and scope of the invention.

What is claimed is:

1. A graphical code reader that is configured to vary resolutions at which images are captured, the graphical code reader comprising:
    an image capture component that is configured to capture images at different resolutions, wherein the image capture component comprises optics and an image sensor, and wherein the optics focus reflected light onto the image sensor in order to capture images;
    a processor;
    memory in electronic communication with the processor;
    instructions stored in the memory, the instructions being executable to:
        provide a sequence that indicates resolutions at which images are going to be captured, wherein the sequence indicates that different images are going to be captured at different resolutions;
        capture the images;
        vary the resolutions at which the images are captured according to the sequence; and
        attempt to decode graphical codes within the captured images.

2. The graphical code reader of claim 1, wherein the images have substantially a same field of view.

3. The graphical code reader of claim 1, wherein the resolutions at which the images are captured are varied automatically.

4. A graphical code reader that is configured to adaptively vary resolutions at which images are captured based on information about a user's decoding environment, the graphical code reader comprising:
    an image capture component that is configured to capture images at different resolutions, wherein the image capture component comprises optics and an image sensor, and wherein the optics focus reflected light onto the image sensor in order to capture images;
    a processor;
    memory in electronic communication with the processor;
    instructions stored in the memory, the instructions being executable to:
        provide a sequence that indicates resolutions at which images are going to be captured, wherein the sequence indicates that different images are going to be captured at different resolutions;
        capture the images;
        capture an image at low resolution whenever a preceding low-resolution image is successfully decoded, and otherwise vary the resolutions at which the images are captured;
        modify the sequence based on decoding history; and
        attempt to decode graphical codes within the captured images.

5. The graphical code reader of claim 4, wherein the images have substantially a same field of view.

6. The graphical code reader of claim 4, wherein the resolutions at which the images are captured are varied automatically.

7. The graphical code reader of claim 4, wherein modifying the sequence comprises modifying a frequency of a particular resolution in the sequence in proportion to success that has been achieved at that resolution.

8. The graphical code reader of claim 4, wherein modifying the sequence comprises maintaining a separate decode count for each resolution at which the images may be captured.

9. The graphical code reader of claim 4, wherein modifying the sequence comprises:
    processing a current image;
    increasing a decode count for the current image's resolution if the current image is successfully decoded; and
    decreasing the decode count for the current image's resolution if the current image is not successfully decoded.

10. The graphical code reader of claim 4, wherein modifying the sequence comprises predicting low-resolution decoding success for higher resolution images that are successfully decoded.

11. The graphical code reader of claim 4, wherein modifying the sequence comprises:
    successfully decoding a high-resolution image;

predicting whether the high-resolution image could have been decoded at one or more lower resolutions;

increasing a high-resolution decode count if it is predicted that the high-resolution image could not have been decoded at any of the one or more lower resolutions; and increasing a lower-resolution decode count if it is predicted that the high-resolution image could have been decoded at a lower resolution.

12. The graphical code reader of claim 11, wherein predicting whether the high-resolution image could have been decoded comprises:

identifying a smallest feature of a graphical code in the image;

counting pixels in the smallest feature of the graphical code; and determining whether the number of pixels in the smallest feature of the graphical code exceeds a threshold value.

13. The graphical code reader of claim 4, wherein modifying the sequence comprises applying a mapping function to a plurality of decode counts.

14. The graphical code reader of claim 4, wherein the instructions are also executable to provide minimum frequencies for the resolutions in the sequence.

15. The graphical code reader of claim 14, wherein the instructions are also executable to ensure that modifications to the sequence comply with the minimum frequencies.

16. The graphical code reader of claim 4, wherein the images are captured in response to user input.

17. A graphical code reader that is configured to adaptively change one or more characteristics of captured images in order to balance decode capability and speed, the graphical code reader comprising:

an image capture component that is configured to capture images at different resolutions, wherein the image capture component comprises optics and an image sensor, and wherein the optics focus reflected light onto the image sensor in order to capture images;

a processor;

memory in electronic communication with the processor;

instructions stored in the memory, the instructions being executable to:

receive user input;

capture the images in response to the user input;

vary resolutions and fields of view at which the images are captured based on at least one of a sequence and decoding history; and attempt to decode graphical codes within the captured images.

18. The graphical code reader of claim 17, wherein the instructions are also executable to:

capture a low-resolution image comprising a graphical code;

attempt to decode the graphical code within the low-resolution image; and if the graphical code is not decoded within the low-resolution image, capture a next image at a higher resolution and with a smaller field of view than the low-resolution image.

19. The graphical code reader of claim 18, wherein if the graphical code is not decoded within the low-resolution image the instructions are also executable to identify the graphical code's position within the low-resolution image, and wherein the smaller field of view of the next image substantially matches the graphical code's position within the low-resolution image.

20. The graphical code reader of claim 17, wherein the instructions are also executable to:

capture a low-resolution image comprising a graphical code;

identify the graphical code's position within the low-resolution image; and capture a next image at a higher resolution and with a smaller field of view than the low-resolution image, wherein the smaller field of view substantially matches the graphical code's position within the low-resolution image.

21. The graphical code reader of claim 17, wherein the resolutions and fields of view at which the images are captured are varied automatically.

* * * * *